United States Patent Office 3,202,612
Patented Aug. 24, 1965

3,202,612
COMPOSITION FOR BRIGHT POLISHING ALUMINUM
George D. Nelson, St. Louis, Mo., assignor to Monsanto Company, a corporation of Delaware
No Drawing. Filed Dec. 5, 1960, Ser. No. 73,511
6 Claims. (Cl. 252—79.2)

This invention relates to the chemical brightening of metals, and to improved acid compositions suitable for use in the chemical brightening of metals. More particularly, this invention relates to improved processes and compositions for the chemical brightening of aluminum.

In recent years there has been a marked increase in the use of chemical brightening processes for polishing metal surfaces. One of the most widely practiced procedures, particularly for brightening aluminum and its alloys, involves the treatment of the metal's surfaces with a mixture of concentrated phosphoric and nitric acids.

Conventional chemical brightening of aluminum with concentrated phosphoric-nitric acid compositions (over which the present invention is a very valuable improvement) is described in great detail in Cohn, U.S. 2,729,551. It will be noted that compositions particularly suitable for brightening aluminum and aluminum alloys generally contain between about 45 and about 98 weight percent of phosphoric acid, between about 0.5 and about 50 weight percent of nitric acid and between about 2 and about 35 weight percent of water. Brightening compositions which are particularly preferred conventionally are those which contain between about 65 and about 85 weight percent of phosphoric acid, between about 1 and about 10 weight percent of nitric acid, and between about 5 and about 34 weight percent of water.

Until very recently, one of the greatest problems that confronted processors who utilized such baths of concentrated phosphoric and nitric acids was the tendency of the baths to release nitric oxide ($NO_2$) fumes. Such fumes are both toxic and disagreeable. Their presence required expensive precautionary measures and facilities for avoiding the dangers resulting therefrom. It was subsequently found that the release of $NO_2$ fumes from the concentrated acid baths could be eliminated by the addition of ammonium compounds to the baths.

The use of ammonium compounds, however, sometimes leads to another problem which normally does not occur when aluminum is brightened in ordinary phosphoric-nitric acid baths. For example, under certain of the conditions conventionally utilized for the bright dipping of aluminum and its alloys in these baths, the presence of ammonium compounds (in quantities such that the normal tendency of these baths to evolve $NO_2$ gas is inhibited) causes localized deposits of tiny crystals on and pitting of, the surfaces of the brightened metal, thereby making the metal surfaces appear unevenly dull in appearance and therefore of poor or of somewhat inferior "brightened" quality.

It is a primary object of this invention to provide concentrated phosphoric-nitric acid compositions suitable for brightening the surfaces of metals such as aluminum and aluminum alloys, which compositions do not evolve $NO_2$ fumes during their use, and which do not cause the formation of micro-crystalline deposits on the surfaces of the treated metal.

It is another primary object of this invention to provide procedures for the chemical brightening of aluminum and its alloys, whereby one can utilize concentrated phosphoric and nitric acid brightening baths containing ammonium compounds to produce brightened aluminum and aluminum alloys of consistently high brightened quality.

It is still another primary object of this invention to provide concentrated phosphoric acid compositions suitable for use in the simplified replenishment of the chemical brightening baths contemplated by the present invention, the utilization of which can result in the continuous production of chemically brightened aluminum of outstanding brightened quality.

It is still another object of the invention to provide concentrated phosphoric-nitric acid brightening compositions which make it possible to materially decrease the cost of chemically brightening aluminum without sacrificing product quality.

The above, as well as other objects of this invention, are accomplished by the provision of baths containing, in addition to phosphoric acid, nitric acid, and ammonium ions, small amounts of dissolved copper plus a "third" acid. The actual mechanisms by which the present invention accomplishes these objectives are not known. It is surprising, however, that the addition of copper plus another or "third" acid to these already strongly acidic brightening baths makes it possible to do so, since the performance of any of them in the bath alone (i.e., copper in the absence of the additional or "third acid"; or a "third acid," such as for example, acetic, sulfuric, citric, oxalic, etc., in the absence of copper) certainly does not suggest that such a specific combination would be so broadly advantageous. For example, if either copper alone or sulfuric acid alone or acetic acid alone, or citric acid alone, etc., is added to a concentrated acid brightening bath containing phosphoric acid, nitric acid and ammonium ions, it is not possible to accomplish all of the above valuable objects of this invention.

In order to substantially reduce the number of pieces that are rejected because of reduced overall brightened quality (due to the effect of the "third acid" which, when used in the absence of copper ions causes a dull finish on the brightened metal pieces), it is essential that the brightening bath contain more than about 0.002 weight percent of dissolved copper. Generally, in order to completely inhibit the formation of the microcrystals, at least about 0.004 weight percent of dissolved copper should be present in the bath, while for extremely high quality of brightening, it is preferable that the copper content of the brightening bath be maintained at between about 0.01 and about 0.03 weight percent.

Although aluminum pieces can be treated in acid brightening baths containing more than about 0.04 weight percent of dissolved copper, such a treatment usually causes the aluminum to assume a definite pink cast, or coloration or sometimes even a darkened or "smutty" type of discoloration. This pink cast or "smutty" discoloration is often objectionable to the customers and thus sometimes makes it necessary for the processor to subject these pinkish pieces to another processing step in order to remove the plated copper. Copper can be added to the phosphoric acid in any of a number of ways. For example, copper metal can be dissolved to yield the proper quantity of copper in solution. It is usually more desirable, however, to add copper as copper hydroxide or in the form of a copper salt such as copper sulfate, copper nitrate, copper orthophosphate, copper chloride, copper ammonium phosphate, copper chromate, etc. The valence state of the copper when it is added to the brightening baths is of no consequence in the practice of this invention, because in the presence of excess nitric acid, for example, in the brightening bath itself, copper is immediately converted to the cupric state if it is not already "cupric."

The term "third acid" is intended to include any acid or combination of acids other than nitric acid and phosphoric acids, which are already present in conventional phosphoric-nitric brightening compositions. The "third acid" must be soluble in the brightening systems to the extent of at least about 1 weight percent, and in addition, must not appreciably decompose or react detrimentally with the usual ingredients of the brightening baths under the relatively severe conditions to which they are often subjected in the practice of brightening aluminum.

Most of the organic acids that satisfy these requirements are generally those which are non-aromatic (aliphatic), are saturated, have dissociation constants (K) greater than about $1 \times 10^{-6}$, and contain in their molecules between about 1.5 and about 4.5 carbon atoms per acid group, such as, for example, acetic, chloroacetic, propionic, oxalic, citric, tartaric and the like.

Inorganic acids that fulfill the above-described requirements for solubility and stability in the brightening systems are exemplified by such acids as sulfuric, perchloric, fluosilicic, etc.

It is preferred, however, particularly where the aluminum metal to be treated might have previously been contacted with calcium or magnesium ions (i.e. where the metal had been washed with hard water prior to the acid brightening treatment so that these ions are introduced into the brightening baths), that the "third acid" be one whose calcium and magnesium salts are soluble in the concentrated phosphoric-nitric acid-ammonium systems to at least an effective extent, and generally to the extent of at least about a percent. Examples of these preferred "third acids," the hardness ion salts of which are sufficiently soluble in the brightening compositions, are acetic, butyric, citric (because citric acid forms a soluble complex with calcium and magnesium ions in the brightening baths), propionic, perchloric, and the like. From the standpoint of cost, general availability, and overall excellence of performance, the "third acids" which are particularly preferred are acetic, sulfuric and citric acids.

It should be noted that, while the halide acids such as hydrochloric, hydrobromic, hydrofluoric acids can be used as the "third acid" in the practice of this invention, they are generally not used because of their extremely high volatility at the temperatures at which aluminum is usually brightened.

It should also be noted that the "third acid" is sometimes introduced into the compositions and brightening baths of this invention in the form of salts, yielding upon dissolution in the acidic systems, the appropriate "third acid," as, for example sodium citrate which, upon dissolution, yields citric acid ions.

Generally, in the normal practice of this invention the total amount of the "third acid" in the brightening bath is maintained within the range of from about 1 to about 8 weight percent, and for highest quality brightening results, within the range of from about 2.5 to about 5 weight percent of the brightening composition. When quantities of the "third acid" greater than about 8 weight percent are present in the bath, the metal pieces are usually not brightened under most conditions which are otherwise satisfactory, but rather exhibit an etched appearance. At concentrations of these acids in the baths lower than about 1 percent, formation of the objectionable micro-crystals is usually not sufficiently inhibited to make possible brightening of an acceptable quality.

It is of general knowledge in the art that the major function of phosphoric acid so far as the metal brightening procedure is concerned (and sulfuric acid, for example, where it was utilized in the past for chemical brightening) is in the control of the viscosity of the brightening solution and as an acceptor for the aluminum which has been "dissolved" by the nitric acid. For this purpose, sulfuric acid has in the past been utilized in certain compositions at levels up to almost 60% of the brightening bath without any harmful effect on the brightened metal pieces. However, in compositions containing phosphoric acid, nitric acid, and an ammonium compound, the presence of more than a few percent of sulfuric acid usually cannot be tolerated because of the excessive action, described above, on the metals. Evidently the sulfuric acid in these latter compositions functions in a decidedly different manner than it does in compositions which do not contain an ammonium compound, for example, or nitric acid.

In order to completely inhibit the evolution of $NO_2$ from the compositions described above, the ionic ratio of ammonium ions to nitrate ions in the compositions is usually maintained at or above 0.8, and preferably above about 1.1, or even above 1.3. Preferably the ammonium ion is added to either the phosphoric acid or the brightening composition as an inorganic ammonium salt, particularly as an ammonium phosphate salt such as diammonium orthophosphate. However, any other ammonium salts such as ammonium sulfate, ammonium bisulfate, ammonium nitrate, monoammonium orthophosphate, ammonium metaphosphate, ammonium chloride, ammonium fluoride, ammonium fluorborate, ammonium arsenate, ammonium vanadate, as well as many others have been found to serve equally well in reducing or eliminating the evolution of $NO_2$ fumes from the mixtures of concentrated phosphoric and nitric acids. The ammonium ion can also be added to either the phosphoric acid compositions or the brightening compositions as ammonia, or even as ammonium hydroxide.

Because of the very valuable benefits that have been shown above to accrue from having ammonium ions, copper ions and the "third acid" in the brightening baths, one might normally expect these materials to be consumed in the brightening process. Surprisingly, however, it appears that the net effect of the copper and "third acid" as well as the ammonium compounds at the concentrations contemplated by the invention, is catalytic, since there is apparently no loss or decrease of these materials from the brightening bath accompanying the brightening process (except for the relatively low loss due to drag-out of the materials with the treated metal pieces). Because of this unexpected lack of chemical consumption of the copper, "third acid" and ammonium ion, it is possible to maintain their respective concentrations at a constant and controlled level simply by adding these materials in a fixed ratio along with the make-up phosphoric acid. (This particular portion of the brightening process will be described in greater detail below.) Consequently, the addition of a copper compound, one of the "third acids" and an ammonium compound to concentrated phosphoric acid constitute preferred embodiments of this invention, as do also the phosphoric acid solutions containing the critical concentrations of these materials.

These latter embodiments of the invention comprise concentrated solutions (generally aqueous) of usually at least 50 weight percent and preferably at least 75 weight percent of either orthophosphoric acid or a material which will hydrolyze or hydrate in the presence of water to yield at least this amount of free orthophosphoric acid, such as, for example, commercial "105%" phosphoric acid (which contains approximately 105% $H_3PO_4$ calculated from the $P_2O_5$ content of the "105%" acid) or even "polymeric" $P_2O_5$, (which is believed to be the orthorhombic crystalline form of $P_2O_5$, is usually a solid, and hydrolyzes to yield $H_3PO_4$ upon its addition to water), to which between about 0.15 and about 2 weight percent (calculated from the ammonium ion content) of an ammonium salt, between about 0.004 and about 0.04 weight percent (calculated from the copper ion content) of a copper salt, and between about 1 and about 8 weight percent of the appropriate "third acid" (which in the case of these concentrated preferred compositions will, in reality, be the "second" necessary acid in said compositions, but which has been called the "third acid" in this discussion in order to indicate that the acids which are added to the conventional compositions to yield the improved compositions of this invention are those which have been discussed heretofore, and called the "third acid"), have been added. The above weight percentage figures are based upon the total weight of the compositions.

Typical specific examples of the foregoing preferred concentrated phosphoric acid compositions which are useful in formulating aluminum brightening baths are prepared by (all parts are by weight, unless otherwise specified):

(1) Adding 4.0 parts of diammonium orthophosphate, 0.09 part of copper sulfate, and 4.3 parts of sulfuric acid (specific gravity, 1.835) to 91.61 parts of 85% phosphoric acid (which will then contain 1.1 weight percent of ammonium ion, 0.03 weight percent of copper ion, and 4 weight percent of sulfuric acid);

(2) Adding 7.1 parts of monoammonium orthophosphate to 0.18 part of copper nitrate hexahydrate, and 4.4 parts of glacial acetic acid to 88.3 parts of 80% phosphoric acid (which will then contain 1.2 weight percent of ammonium ion, 0.04 weight percent of copper ion, and 4.7 weight percent of acetic acid);

(3) Adding 6.75 parts of diammonium orthophosphate, 0.34 part of tribasic copper orthophosphate trihydrate, and 6.64 parts of sulfuric acid (specific gravity, 1.835) to 86.27 parts of 105% phosphoric acid (which will then contain sufficient ammonium, copper, and sulfuric acid to yield upon dilution with water to a concentration of 85% $H_3PO_4$ 1.5 weight percent of ammonium ion, 0.04 weight percent of copper ion and 5 weight percent of sulfuric acid);

(4) Adding 3.8 parts of ammonium sulfate, 0.06 part of copper sulfate and 2.5 parts of glacial acetic acid to 93.6 parts of 85% phosphoric acid (which will then contain 1.0 weight percent of ammonium ion, 0.015 weight percent of copper ion, 2.8 weight percent of sulfuric acid [from the sulfate salts], and 2.5 weight percent of acetic acid);

(5) Adding 0.8 part of anhydrous ammonia, 0.08 part of copper sulfate pentahydrate and 4.0 parts of citric acid to 95 parts of 85% phosphoric acid (which will then contain approximately 0.8 weight percent of ammonium ion, 0.02 weight percent of copper ion, and 4 weight percent of citric acid;

(6) Adding 3 parts of diammonium sulfate, 1.0 part of copper sulfate pentahydrate and 2 parts of 93.5% sulfuric acid to 95 parts of 85% phosphoric acid (which will then contain approximately 1.1 weight percent of ammonium ion, 0.025 weight percent of copper ion, and 3.8 weight percent of sulfuric acid);

(7) Adding 6.75 parts of diammonium orthophosphate, 0.18 part of copper nitrate hexahydrate and 4.0 parts of acetic acid to 89.07 parts of 85% phosphoric acid (which will then contain 1.5 weight percent of ammonium ion, 0.04 weight percent of copper ion and 4 weight percent of acetic acid).

It should be noted that concentrated phosphoric acid compositions containing greater quantities of ammonium and copper ions and the "third acid" than those described above are also within the scope of this invention, since such compositions can easily be diluted before use with, for example, additional phosphoric acid. Similarly, if the evaporation rate of water from the brightening baths can be reduced, more dilute solutions will be desirable.

The very valuable benefits resulting from the use of compositions such as the foregoing will be illustrated subsequently in Example VIII.

There are many operating variables in the chemical brightening processes contemplated by this invention, which can affect the quality of the finished metal pieces. Most of these are well within the ability and experience of anyone reasonably skilled in the art to control. The effects of the most important of these variables will be described below.

By far the most important variable in these processes is the composition of the bath itself. Generally the limits of bath compositions which make it possible to brighten pieces of aluminum acceptably can be varied to a slight extent by regulating other variables. Usually, however, the result of such regulations is a sacrifice in the quality of brightening, production rate, operational cost, or an undesirable increase in the evaporation rate of nitric acid from the bath.

Optimum brightening results in the practice of this invention are usually attained when the baths contain between about 1 and about 5 weight percent, and even more preferably, between about 2.5 and about 3.5 weight percent of nitric acid. The use of more than about 5 weight percent of nitric acid in the brightening bath compositions can sometimes result in what is termed by the trade as "transfer etch" (or, in other words, an uneven brightening of the treated metal pieces), and also unnecessarily higher losses of nitric acid from the baths by evaporation. When less than about 1 weight percent of nitric acid is present in the brightening compositions, the bath loses its ability to brighten aluminum satisfactorily.

The temperatures at which chemical brightening of aluminum is accomplished in concentrated phosphoric-nitric acid brightening baths is usually between about 75 and about 110° C. and preferably between about 85 and about 100° C. At temperatures higher than about 110° C. undesirable effects such as excessive corrosion of the materials of construction of the bath, pitting and other surface defects of treated aluminum pieces, and excessive evaporation of nitric acid from the bath can occur.

Depending somewhat upon the temperature at which the bath is operated, and upon the concentration of the nitric acid in the brightening composition, usually the pieces of aluminum are sufficiently brightened within slightly more than 30 seconds after they have been immersed in the bath, although, in many cases the time of treatment can require as many as 3–5 minutes or even more.

Within a short period of time after concentrated phosphoric-nitric acid brightening baths have been placed into operation, significant concentrations of metallic (aluminum) phosphate salts will build up in the treating baths. For example, brightening compositions used for treating aluminum will generally contain between about 1 and about 20 weight percent of aluminum phosphate. It is usually better in the practice of this invention to maintain between about 5 and about 11 weight percent of $AlPO_4$ in the brightening bath since by operating within this range such undesirable effects as transfer etch on the treated metal surfaces (due to high aluminum dissolution rates caused by low levels of $AlPO_4$ in the baths) and generally poor brightened quality along with wasted raw materials (due to extremely high $AlPO_4$ levels in the brightening baths) can be avoided. For brightening results of optimum quality, over an extended period of operative time the $AlPO_4$ content of the brightening composition is usually controlled within the range of from about 7 to about 10 weight percent.

Some of the advantages and preferred embodiments of this invention are illustrated in the following examples. In all of these examples, parts given are by weight unless otherwise described.

Example I illustrates some of the major problems which can be overcome by practicing this invention.

EXAMPLE I

An aluminum brightening operation is carried out by dipping metallic aluminum objects for about 2 minutes into a composition containing about 3 parts $HNO_3$, about 72 parts $H_3PO_4$, and about 8 parts $AlPO_4$, and about 17 parts $H_2O$ at a temperature of about 100° C. Copious quantities of $NO_2$ fumes are evolved from the brightening bath, particularly whenever the aluminum objects are immersed in the bath. The same operation is then carried out after dissolving 4 parts of diammonium orthophosphate in the bath. After the addition of the ammonium salt there is no further evolution of $NO_2$ fumes from the bath. There is also a significant reduction in the amounts of both nitric acid and phosphoric acid which are consumed in the process. Upon close inspection, some of the pieces brightened in the presence of the ammonium compound contain a deposit of tiny crystals, possibly of aluminum phosphate, on part of their surfaces.

Examples II through VII illustrate the effectiveness of some of the embodiments of the present invention in inhibiting or eliminating the deposition of micro-crystals from brightening baths containing the ammonium compound.

EXAMPLE II

An aluminum brightening operation is carried out by dipping metallic aluminum objects for about 2 minutes into a composition, at about 100° C., containing about 3 parts $HNO_3$, about 65 parts $H_3PO_4$, about 8 parts $AlPO_4$, about 4 parts $(NH_4)H_2PO_4$, about 1 part of $CuSO_4 \cdot 5H_2O$, about 4 parts of 93.5% sulfuric acid, and about 15 parts of $H_2O$. No $NO_2$ fumes are evolved from the bath during the operation. The brightened quality of pieces of aluminum brightened by this procedure is excellent, with none of the undesirable micro-crystals being formed on their surfaces.

EXAMPLE III

An aluminum brightening operation is carried out at about 95° C. by dipping aluminum objects for about 2 minutes into a composition identical to that utilized in Example II, above, except that the 4 parts of sulfuric acid in the composition of Example II is replaced by 4 parts of acetic acid. No $NO_2$ fumes are evolved from the bath during this operation. The brightened quality of the aluminum objects brightened during this operation is excellent. In addition no micro-crystals can be found on their surfaces.

EXAMPLE IV

An aluminum brightening operation is carried out at about 95° C. by dipping aluminum objects for about 2 minutes into a composition identical to that utilized in Example II, above, except that the 4 parts of sulfuric acid in the composition of Example II is replaced by 4 parts of citric acid. No $NO_2$ fumes are evolved from the bath during this operation. The brightened quality of the aluminum objects brightened during this operation is excellent. In addition, no micro-crystals can be found on their surfaces.

EXAMPLE V

An aluminum brightening operation is carried out at about 95° C. by dipping aluminum objects for about 2 minutes into a composition identical to that utilized in Example II, above, except that the 4 parts of sulfuric acid in the composition of Example II is replaced by 4 parts of oxalic acid. No $NO_2$ fumes are evolved from the bath during this operation. The brightened quality of the aluminum objects brightened during this operation is excellent. In addition no micro-crystals can be found on their surfaces.

EXAMPLE VI

An aluminum brightening operation is carried out by dipping metallic aluminum objects for about 1 minute into a composition, at about 105° C. containing about 2.8 parts of $HNO_3$, about 63 parts of $H_3PO_4$, about 10 parts of $AlPO_4$, about 4 parts of propionic acid, and about 16 parts of $H_2O$. No $NO_2$ fumes are evolved from the bath during the operation. The brightened quality of pieces of aluminum, brightened by this procedure, is excellent, with none of the undesirable micro-crystals being formed on their surfaces.

EXAMPLE VII

An aluminum brightening operation is carried out by dipping metallic aluminum objects for about 1 minute into a composition, at about 105° C. containing about 2.8 parts of $HNO_3$, about 63 parts of $H_3PO_4$, about 9 parts of $AlPO_4$, about 4 parts of acetic acid and about 16 parts of $H_2O$. No $NO_2$ fumes are evolved from the bath during the operation. The brightened quality of pieces of aluminum, brightened by this procedure, is excellent, with none of the undesirable micro-crystals being formed on their surfaces.

Since the present invention can be practiced utilizing any of the alloys of aluminum which can be utilized in conventional chemical brightening processes and compositions, the particular alloys used in these examples have not been noted.

Another of the very valuable advantages of this invention is that according to its practice, one can operate a chemical brightening bath continuously, for extended periods of time producing objects of high brightened quality—yet at a lower raw material cost per unit of aluminum surface treated than one can by conventional processes. In order for one to more clearly understand this particular advantage, it will be necessary to detail what is meant by the term "operating equilibrium-point."

The term "operating equilibrium-point" can perhaps be most simply defined as the particular brightening bath composition at which, for a given set of conditions (such as treatment time, bath temperature, shape of the piece and piece drainage time) the amount of phosphoric acid consumed in dissolving aluminum is balanced by the amount of $AlPO_4$ removed from the bath in the liquid that adheres to treated metal parts after treatment. Due to the nature of any chemical brightening procedure that is operated continuously to produce high quality work (as was noted above) it is necessary to control the nitric acid level in the bath. If the nitric acid is controlled at any desirable level to yield high quality work, then the "operating equilibrium point" is arrived at within a relatively short time after the operation of a bath is begun, and is maintained throughout the bath's useful life simply by replenishing the bath components from time to time.

It has been found that the presence of various materials as well as the amounts of these materials in the chemical brightening bath have a decided effect on the "operating equilibrium point." The following table illustrates this fact. Since the rate of consumption of nitric acid does not vary between various bath compositions nearly so much as that of phosphoric acid, its cost has not been considered in compiling the data for Table I. The cost figures in Table I are relative and determined empirically, based on the amount of phosphoric acid consumed per 1000 square feet of aluminum surfaces treated when the brightening bath was operated at its "operating equilibrium point." While it is true that the actual cost figures will vary to some extent, depending upon the particular temperature and time conditions under which the bath is operated, it is believed that the relative costs of using these compositions will not vary greatly with changed conditions from those shown in the table. Note particularly that some of the compositions of the present invention perform decidedly better by this criterion than do conventional compositions (a) and (b).

Table I

RELATIVE COST FOR BRIGHTENING ALUMINUM [1]

| Bath composition: [2] | Relative cost |
|---|---|
| (a) No additives | 1.30 |
| (b) 1% NH₄ only | 1.22 |
| (c) 2% H₂SO₄ only | 1.06 |
| (d) 4% H₂SO₄ only | 1.05 |
| (e) 2% H₂SO₄ + 0.02% Cu + 1% NH₄ | 1.17 |
| (f) 4% H₂SO₄ + 0.02% Cu + 1% NH₄ | 1.00 |
| (g) 4% acetic acid + 0.02% Cu + 1% NH₄ | 1.00 |
| (h) 4% citric acid + 0.02% Cu + 1% NH₄ | 1.03 |

[1] At 95° C.; 2.5 minutes' immersion; bath stirring sufficient to keep bath practically homogeneous.
[2] 3% HNO₃; water and phosphoric acid content varied to keep the composition within 2%, based on the H₃PO₄ content of the composition, of the point at which the water is saturated.

Example VIII illustrates the use of one of the preferred concentrated phosphoric acid compositions of this invention in the make up, replenishment, and maintenance of an aluminum brightening bath.

EXAMPLE VIII

An aluminum brightening composition is made up by blending 33 gallons of concentrated nitric acid (67% HNO₃) with 967 gallons of 85% (concentrated) phosphoric acid into which has been dissolved 3 weight percent of diammonium orthophosphate, 0.08 weight percent of copper sulfate pentahydrate, and 4.0 weight percent of acetic acid. After this blend is warmed to about 95° C., 19 pounds of clean scrap aluminum are dissolved therein, bringing the AlPO₄ content of the bath to about 8 weight percent. Thereafter, the bath temperature is maintained at about 100° C. Aluminum objects are treated by immersion for 2 minutes in the bath at a rate corresponding to the treatment of about 3000 square feet of aluminum surface area per day. After their immersion in the brightening bath the objects are raised from the bath and allowed to drain for about 1 minute before they are moved along for rinsing and/or subsequent treatment. Brightening in this manner is carried out for about 3 months yielding high quality work at surprisingly low raw material cost, with practically no micro-crystals being observed on the treated aluminum and no NO₂ fumes being evolved by the bath. During this extended period of time the total solution in the bath is maintained at approximately 1000 gallons by the periodic addition of the above-described concentrated phosphoric acid (containing ammonium and copper ions and acetic acid). A level of approximately 3 weight percent of HNO₃ is also maintained in the composition by an independent control procedure.

When sulfuric acid is used in the above procedure, difficulties are sometimes encountered when calcium and magnesium (hardness) ions are introduced into the bath, due to the formation of their insoluble sulfate salts.

It is another distinct advantage that the concentrated phosphoric acid compositions of this invention (containing ammonium and copper ions plus a "third acid") are distinctly inhibited from corroding ferruginous metals such as iron and steel, and also nickel. The data in Table II illustrates this surprising corrosion-inhibiting action of some of the preferred embodiments of the invention.

Table II

CORROSION INHIBITION [1]

| Phosphoric acid composition: | Corrosion rate, m.p.y.[2] |
|---|---|
| Commercial food grade, 85% H₃PO₄ | 0.70 |
| 85% H₃PO₄, 13% (NH₄)₂HPO₄, 0.08% CuSO₄, 4% acetic acid | 0.15 |
| 85% H₃PO₄, 13% (NH₄)₂HPO₄, 0.09% CuSO₄, 4% H₂SO₄ | 0.13 |

[1] On type 316 stainless steel.
[2] Coupons immersed at 70° C. for 242 hours.

This corrosion-inhibiting property of the concentrated phosphoric and compositions of the present invention is a valuable asset, since containers for their shipment do not require special glass linings, etc., as might ordinarily be expected.

What is claimed is:

1. A composiion, suitable for brightening the surfaces of aluminum and aluminum alloys, which comprises from about 45 to about 90 weight percent of phosphoric acid, from about 1 to about 10 weight percent of nitric acid, from about 2 to about 35 weight percent of water, from about 0.004 to about 0.04 weight percent of dissolved copper, an ammonium salt in an amount sufficient to produce in said composition from about 0.15 to about 4 weight percent of ammonium ions, and from about 1 to about 8 weight percent of an organic saturated aliphatic acid having in its molecule between about 1.5 and about 4.5 carbon atoms per acid group.

2. A composition suitable for brightening the surfaces of aluminum and aluminum alloys, which comprises from about 65 to about 85 weight percent of phosphoric acid, from about 2.5 to about 3.5 weight percent of nitric acid, from about 2.5 to about 34 weight percent of water, from about 0.01 to about 0.03 weight percent of dissolved copper, from about 5 to about 11 weight percent of aluminum phosphate, ammonium salts in an amount sufficient to produce in said composition from about 0.15 to about 4 weight percent of ammonium ions, and from about 2.5 to about 5 weight percent of acetic acid.

3. A composition suitable for brightening the surfaces of aluminum and aluminum alloys, which comprises from about 65 to about 85 weight percent of phosphoric acid, from about 2.5 to about 3.5 weight percent of nitric acid, from about 2.5 to about 34 weight percent percent of water, from about 0.01 to about 0.03 weight percent of dissolved copper, from about 5 to about 11 weight percent of aluminum phosphate, ammonium salts in an amount sufficient to produce in said composition from about 0.15 to about 4 weight percent of ammonium ions, and from about 2.5 to about 5 weight percent of citric acid.

4. A concentrated phosphoric acid composition suitable for use as an additive for the preparation of an aluminum brightening bath containing from about 1 to about 10 weight percent of nitric acid in addition to said composition; said composition comprising from about 45 to about 90 weight percent of phosphoric acid, from about 2 to about 35 weight percent of water, from about 0.004 to about 0.04 weight percent of dissolved copper, an ammonium salt in an amount sufficient to produce in said composition from about 0.15 to about 4 weight percent of ammonium ions, and from about 1 to about 8 weight percent of an organic saturated aliphatic acid having in its molecule between about 1.5 and about 4.5 carbon atoms per acid group.

5. A concentrated phosphoric acid composition suitable for use as an additive for the preparation of an aluminum brightening bath containing from about 2.5 to about 3.5 weight percent of nitric acid in addition to said composition; said composition comprising from about 65 to about 85 weight percent of phosphoric acid, from about 2.5 to about 34 weight percent of water, from about 0.01 to about 0.03 weight percent of dissolved copper, ammonium salts in an amount sufficient to produce in said composition from about 0.15 to about 4 weight percent of ammonium ions, and from about 2.5 to about 5 weight percent of acetic acid.

6. A concentrated phosphoric acid composition suitable for use as an additive for the preparation of an aluminum brightening bath containing from about 2.5 to about 3.5 weight percent of nitric acid in addition to said composition; said composition comprising from about 65 to about 85 weight percent of phosphoric acid, from about 2.5 to about 34 weight percent of water, from about 0.01 to about 0.03 weight percent of dissolved copper, ammonium salts in an amount sufficient to produce in said composition from about 0.15 to about 4 weight percent of ammonium ions, and from about 2.5 to about 5 weight percent of citric acid.

References Cited by the Examiner

UNITED STATES PATENTS 2,620,265 12/52 Hesch _____ 156—21
2,729,551 1/56 Cohn _____ 156—21

FOREIGN PATENTS 1,093,316 11/54 France.

ALEXANDER WYMAN, *Primary Examiner.*

EARL M. BERGERT, JACOB STEINBERG, CARL F. KRAFFT, *Examiners.*